July 17, 1923.
A. J. WIEGAND
TIRE
Filed Dec. 15, 1916
1,461,766
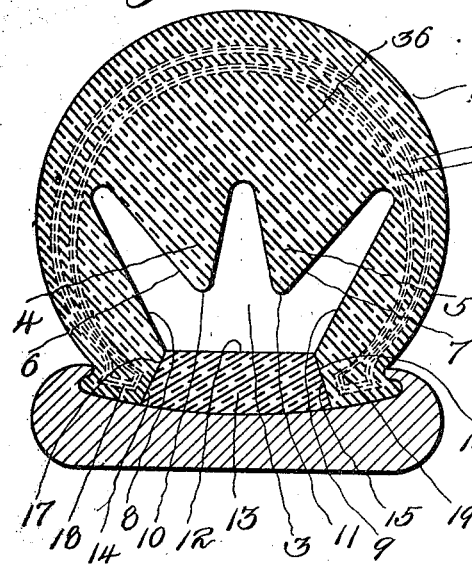
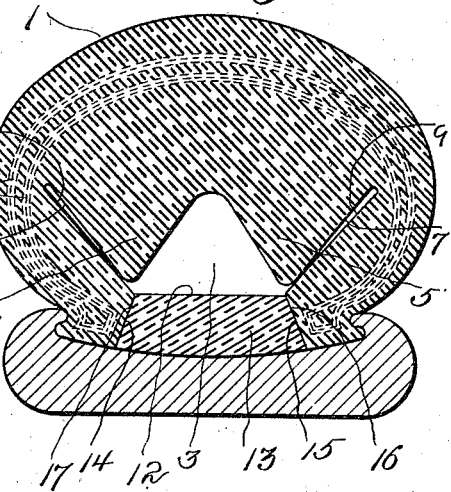
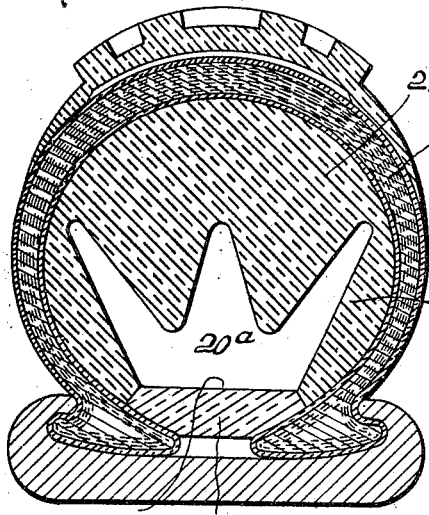
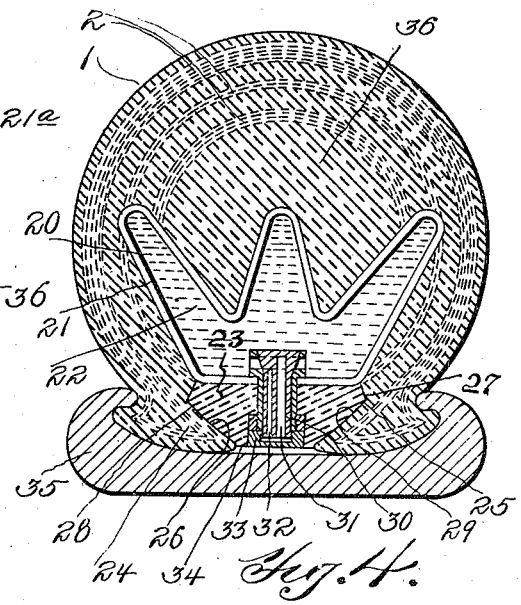
Witness
William P. Keller.
William D. Wiegand.
Inventor
Andrew J. Wiegand Patented July 17, 1923.

1,461,766

UNITED STATES PATENT OFFICE.

ANDREW J. WIEGAND, OF BALTIMORE, MARYLAND.

TIRE.

Application filed December 15, 1916. Serial No. 137,174.

*To all whom it may concern:*

Be it known that I, ANDREW J. WIEGAND, a citizen of the United States, residing at Baltimore, in the county of Baltimore City and State of Maryland, have invented certain new and useful Improvements in Tires, of which the following is a specification.

This invention relates to improvements in resilient tires and has for its object to provide a rubber tire having inwardly projecting V-shaped annular ribs adapted to prevent the tire from collapsing under pressure.

Another object of the invention is to provide a cushion tire having an annular channel therethrough with inwardly projecting ribs and walls arranged to stop the inward movement of said ribs under pressure to prevent the collapse of the tire.

A still further object of the invention is to provide a cushion tire having an annular channel and a rubber ring adapted to form a closure for said channel.

With the above and other objects in view, which will hereinafter be more fully explained, I have invented the device illustrated in the accompanying drawings, in which—

Figure 1 is a cross section of my improved tire,

Figure 2 is a similar view showing it in a compressed state,

Figure 3 is a view similar to Figure 1, illustrating a modification.

Figure 4 is a similar view showing another modification.

Like reference characters indicate like parts throughout the following specification and in the several views in the drawings, in which 1 indicates a tire formed of rubber having fabric reinforcing 2 therein and a W-shaped channel 3 extending entirely therearound forming two annular ribs 4 and 5 with outer inclined walls 6 and 7, the inclinations of which are about the same as the inner side walls 8 and 9 of the channel 3, so that under extraordinary pressure as indicated in Figure 2, the walls 6 and 7 will seat against the walls 8 and 9 and will be held there by friction of the contacting rubber surfaces of the said walls and bolster up the tire and prevent its collapse. Additional pressure may overcome the friction of said walls in which case the edges 10 and 11 of said ribs 4 and 5 will seat against the inner surface 12 of closure member 13 which consists of a ring of rubber or other suitable material and has inclined side walls 14 and 15 which seat against and frictionally engage the side inner walls 16 and 17 of the edges 18 and 19 of the tire. This construction will give as much resiliency as a highly inflated pneumatic tire and under great pressure will not collapse because of the ribs 4 and 5 to an extent that will prove detrimental or wear the tire.

In Figure 3 I show a slight modification of the invention in which tire member 21 is seated within an ordinary casing $21^a$, channel $20^a$ being closed with the ring $13^a$ in such manner that the air contained within the channel $20^a$ is sealed within said channel and will act as a cushion upon compression to assist in preventing the collapse of the tire upon pressure thereof.

In Figure 4 I show another modification of the invention in which an inner tube 20 is provided which may be inflated with a fluid if desired to a pressure which will partially prevent the collapse of the tire but not to such an extent as to cause undue pressure upon the tube, the inner casing as previously described being relied upon to a greater extent than fluid pressure within the inner tube to prevent collapse of the tire under pressure. In this form of the invention, the closure ring 23 seats within and upon the edges 24 and 25 of the casing, the walls 26 and 27 being slightly arcuate to conform to the curvature of the wall surfaces 28 and 29 of the casing.

A valve 30 may be provided in either form of the invention having a channel 31 for admitting the fluid filling material 22 and a smaller channel 32 for permitting superfluous air in the tire channel to pass out. A cap 33 forms a closure for the valve. This valve does not project beyond the plane of the surface 34 of the closure ring 13, thus when the tire rotates on the wheel and relative to the rim 35 as is often the case, the valve is not held by the rim and caused to mutilate any part of the tire. The portion 36 of the tire may be of softer rubber than the balance of the tire.

Having now described my invention, that which I claim to be new and desire to procure by Letters Patent is:—

1. A cushion tire having an annular channel extending from its inner edge, a closure ring for said edge, said channel having walls inclining to the inner surface of said ring, and a pair of annular ribs projecting toward said ring, the outer walls of said ribs being adapted to seat against said first walls.

2. A cushion tire having an annular channel extending from its inner edge, an imperforate closure ring for said edge, said channel having walls inclining to the inner surface of said ring, and a pair of annular ribs projecting toward said ring, the outer walls of said ribs being adapted to seat against said first walls, said rib walls being inclined.

3. In a cushion tire having an annular channel and ribs projecting thereinto toward the opening of the tire, said ribs having inclined walls, said channel having inclined walls against which said first inclined walls are adapted to seat and a ring forming a closure for said tire opening.

4. In a cushion tire having an annular channel and ribs projecting thereinto toward the opening of the tire, said ribs having inclined walls, said channel having inclined walls against which said first inclined walls are adapted to seat and a ring forming a closure for said tire opening, said ribs having edges adapted to seat upon said ring under undue pressure.

5. In a cushion tire, a plurality of spaced apart annular inner grooves terminating in a common channel, a ring for closing said channel and annular ribs formed by said groove, the edges of which are adapted to hold said tire against collapse, said channel having inclined side walls and said ribs having similarly inclined walls adapted to seat against the first walls under pressure to prevent the collapse of the tire and a filler valve flush with the inner surface of said ring.

6. A tire having an annular channel and solid sides with flat inclined inner walls and annular ribs projecting from the tread portion of the tire and adapted to seat upon said inclined walls, said walls extending from points adjacent the tread portion of the tire to the inner edges thereof.

7. A tire having an annular channel and solid sides with flat inclined inner walls and annular ribs projecting from the tread portion of the tire and adapted to seat upon said inclined walls, said walls extending from points adjacent the tread portion of the tire to the inner edges thereof, said ribs having inclined walls.

8. A tire having an annular channel and solid sides with flat inclined inner walls and annular ribs projecting from the tread portion of the tire and adapted to seat upon said inclined walls, said walls extending from points adjacent the tread portion of the tire to the inner edges thereof, said ribs having inclined walls, each of said ribs having an outer inclined wall for engagement with one of said side walls.

9. A tire having three annular channels terminating in a common channel, ribs forming said first channels, the walls of all of said channels being inclined, certain of said walls being adapted to contact one another, and a ring forming a closure for said channel.

10. A tire having three annular channels terminating in a common channel, ribs forming said first channels, the walls of all of said channels being inclined, certain of said walls being adapted to contact one another, and a ring forming a closure for said channel, certain walls of said ring being inclined, said tire having inclined walls for engagement with said inclined ring walls.

In testimony whereof I affix my signature in the presence of two witnesses.

ANDREW J. WIEGAND.

Witnesses:
WILLIAM P. KELLER,
WILLIAM D. WIEGAND.